United States Patent [19]

Niemeyer, III

[11] Patent Number: 4,794,408

[45] Date of Patent: Dec. 27, 1988

[54] FOLLOWING ERROR LIMIT SYSTEM FOR GRAPHIC RECORDER

[75] Inventor: Robert H. Niemeyer, III, Martinez, Calif.

[73] Assignee: AM International Corporation, Chicago, Ill.

[21] Appl. No.: 75,531

[22] Filed: Jul. 20, 1987

[51] Int. Cl.[4] .................. G01D 15/16; G06F 15/626
[52] U.S. Cl. .............................. 346/139 R; 364/520; 346/141
[58] Field of Search ................ 346/139 R, 29, 46, 49, 346/108, 141; 364/520

[56] References Cited

U.S. PATENT DOCUMENTS 4,573,129 2/1986 Tribolet ..................... 346/139 R

Primary Examiner—E. A. Goldberg
Assistant Examiner—Mark Reinhart
Attorney, Agent, or Firm—Roy A. Ekstrand; Nicholas A. Camasto

[57] ABSTRACT

A following error limit system is operative within a graphic recording system having a pen carriage moveable along a first path and a media moveable along a second path. A closed loop servo system is operative upon the pen carriage motor and is controlled by a position information processor. A following error processor is coupled to the servo system and compiles a periodically sampled table of absolute position, commanded position and following error for the servo system during the initialization process. The carriage is moved in a first direction at a constant velocity until it impacts a fixed limit stop which impeads further carriage motion. The following error processor determines the absolute or limit position of the pen carriage on the basis of the information derived from the servo system. The system functions without the use of external limit switches and limit detectors.

9 Claims, 4 Drawing Sheets

FIG. 4

| Time | Abs Pos | Com Pos | FE | FE Δ |
|------|---------|---------|----|----|
| 0 | 10 | 11 | 1 | 0 |
| 1 | 11 | 12 | 1 | 0 |
| 2 | 12 | 13 | 1 | 0 |
| 3 | 13 | 14 | 1 | 0 |
| 4 | 14 | 15 | 1 | 0 |
| 5 | 15 | 16 | 1 | 0 |
| 6 | 16 | 17 | 1 | 0 |
| 1000 | 1010 | 1011 | 1 | 0 |
| 1001 | 1011 | 1012 | 1 | 0 |
| 1002 | 1012 | 1013 | 1 | 0 |
| 1003 | 1013 | 1014 | 1 | 0 |
| 1004 | 1013 | 1015 | 2 | 1 |
| 1005 | 1013 | 1016 | 3 | 2 |
| 1006 | 1013 | 1017 | 4 | 3 |
| 1007 | 1013 | 1018 | 5 | 4 |
| 1008 | 1013 | 1019 | 6 | 5 |
| 1009 | 1013 | 1020 | 7 | 6 |
| 1010 | 1013 | 1021 | 8 | 7 |
| 1011 | 1013 | 1022 | 9 | 8 |
| 1012 | 1013 | 1023 | 10 | 9 |
| 1013 | 1013 | 1024 | 11 | 10 |
| 1014 | 1013 | 1025 | 12 | 11 |
| 1015 | 1013 | 1026 | 13 | 12 |
| 1016 | 1013 | 1027 | 14 | 13 |
| 1017 | 1013 | 1028 | 15 | 14 |
| 1018 | 1013 | 1029 | 16 | 15 |
| 1019 | 1013 | 1030 | 17 | 16 |
| 1020 | 1013 | 1031 | 18 | 17 |
| 1021 | 1013 | 1032 | 19 | 18 |

FOLLOWING ERROR LIMIT SYSTEM FOR GRAPHIC RECORDER

CROSS REFERENCE TO RELATED APPLICATIONS

This application discloses apparatus described and claimed in the following related applications which are incorporated by reference:

AUTOMATIC PEN POSITIONER FOR GRAPHIC RECORDER, filed 20 July 1982 in the name of Robert Niemeyer, Ser. No. 7,075,430.

ROTARY ACTION GRAPHIC RECORDING SYSTEM, filed 20 July 1987 in the name of Robert Niemeyer, serial number 07/075,533.

FIELD OF THE INVENTION

This invention relates generally to recording systems and particularly to those in which one or more recording elements are carried by a carriage moveable along a carriage path and in which a recording media is moved relative to the path of carriage motion to provide the desired recording upon the media.

BACKGROUND OF THE INVENTION

Through the years a number of recording devices have been created which provide a graphic output under computer control. Such devices include both graphic recorders and photoplotters in which a moveable recording element carriage is moved back and forth along a first path while a recording media is moved back and forth along a second path. In most instances, the motion paths for the media and the recording element carriage are perpendicular to each other.

In graphic recorders, one or more recording elements such as pens, are carried by the carriage and supported above the media. Means are provided for lowering one of the pens into contact with the media during times in which recording upon the media is desired. In photoplotters, the media used is a photosensitive material and hhe recording element comprises a focussed light source directed toward the media.

In either case, the recording operation takes place in response to computer control which operates the recording element carriage and media movement in a coordinated fashion to produce the desired recorded image upon media. In most systems, the recording element carriage is supported by one or more roller and track mechanisms which permit the free movement of the carriage along the carriage path. Usually, the recording element carriage is coupled to a continuous band drive systmm in which a pair of opposed rollers are supported at each end of the carriage path and a flexible band encircles the rollers and is supported in tension. At least one of the rollers is coupled to a drive motor which provides movement of the carriage band which in turn moves the carriage along the carriage path.

Because the control of carriage motion by the computer drive system requires that the computer be given precise information as to the position of the recording element carriage at all times, various devices are used to provide carriage position information to the computer. Accuracy of this information is essential for the computer to properly coordinate the relative motion between the recording element carriage and the media. While a number of different systems have been utilized to provide this information, all must provide two basic information inputs for the proper operation of the computer control system. The first is that of relative movement of the pen carriage and the second is an absolute or reference point. One of the most commonly used systems to provide relative information is known as an encoder system in which an encoder element is coupled to the motor drive system and provides a series of output pulse signals in direct correspondence to the operation of the drive system such that incremental motion information is available to the computer control. While various mechanical and electromechanical arrangements have been utilized through the years, one of the more popular encoders uses a roller or disk having a plurality of regularly spaced interleaved markings of opposite optical character, such as reflective and nonreflective which is coupled directly to the drive system. A light source is directed at the optical encoder disk and the reflected light information from the encoder disk is received by a light detecting device, which in turn produces digital information signals for communication to the computer control system. In its normal operation, the motion of the drive system in either direction results in the generation of a series of pulse signals which are, in essence, counted by the computer to determine relative motion of the carriage.

As to the need for information relating to absolute or reference position, it is essential that a reference starting point be given the computer control system to facilitate its translation of the relative information provided by the encoder into an actual or absolute position of the recording element carriage at any given time. Once the computer control system has received the absolute position, it simply maintains a count of the relative motion pulse signals from the encoder to determine the instantaneous position of the carriage at any given time. Because the accuracy of the computer systems determination of recording element carriage motion is dependent upon the accuracy and precision of the initial reference position, practitioners in the art have undertaken various approaches to providing the reference information.

In the most commonly used referencing systems, the recording element carriage is caused to move to one extreme position of its travel path and to encounter a limit detecting device. Such devices are frequently referred to as limit switches and may be mechanical, magnetic or optical in their construction. Regardless of the type selected, their basic function remains the same in that they provide an output signal once the recording element carriage has reached the reference position. In mechanical limit devices, a precision switch is positioned to be tripped or triggered by the arrival of the recording element carriage. In magnetic limit devices, an electromagnetic sensing device is positioned in the path of the recording element carriage and is tripped by the change in its magnetic field resulting from the carriage arrival. Similarly, optical limit devices provide a stationary light source and light receiver positioned on opposite sides of the carriage path. Such systems utilize the interruption of transmission caused by the arrival of the recording element carriage to indicate the reference or limit condition.

While such systems have heretofore provided the necessary reference or limit information, they are frequently costly and are often unreliable. In addition, the accuracy of such limit sensing systems requires that all parts utilized be precisely controlled. The need for precision control is particularly encountered in the use of mechanical switches, in that the actual switch tripping action must be extremely precise to provide accurate limit information.

There arises therefore a need in the art for a low cost, easy to manufacture and reliable system for providing the limit switch function in moveable carriage type recording systems which also provides the accuracy required for quality recording.

SUMMARY OF THE INVENTION

Accordingly, it is a general object of the present invention to provide an improved recording system. It is a more particular object of the present invention to provide an improved limit sensing system for use in a moveable carriage type recording system.

In accordance with the invention there is provided for use in a graphic recorder having motor drive means for moving a pen carriage back and forth along a carriage path and servo control means operative upon the motor drive means to control pen carriage motion, limit means for establishing a carriage travel reference point having means obstructing carriage motion at a predetermined point, sensing means coupled to the servo control means detecting the response of the servo control means to the carriage obstruction, and reference means coupled to the sensing means establishing a carriage travel reference point when a carriage obstruction is caused.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 4 is a data table for the graphic recorder and following error limit system constructed in accordance with the present invention.

DESCRIPTION OF THE PREFERRED EMBODIMENT

Figure 1:
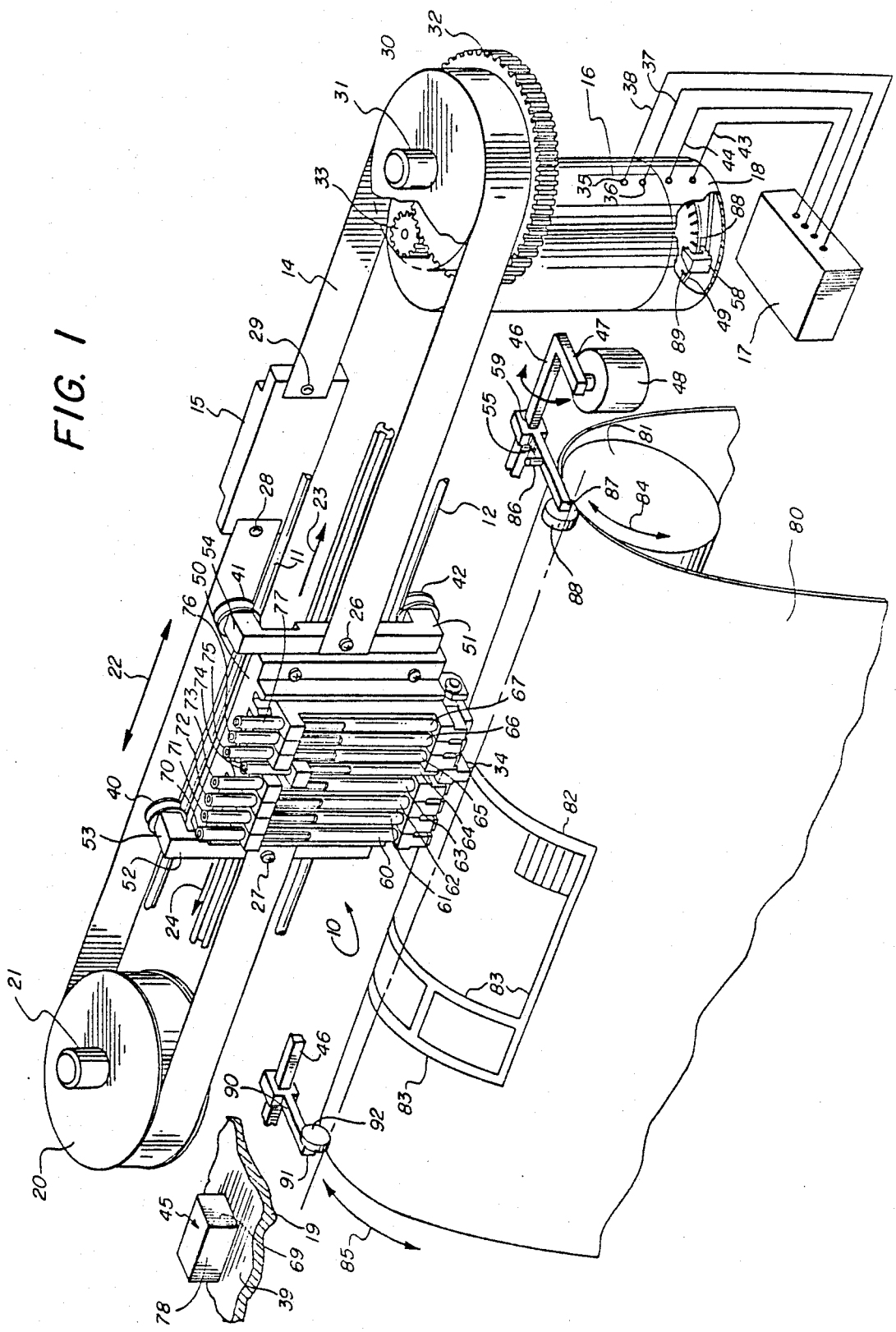
FIG. 1 is a partially sectioned perspective view of a graphic recorder and following error limit system constructed in accordance with the present invention.

FIG. 1 sets forth a perspective view of a graphic recording system including a following error limit system constructed in accordance with the present invention. While the graphic recording system shown is the system set forth in the above-referenced copending application for a Rotary Action Graphic Recording System, it will be apparent to those skilled in the art that the present invention is useable with virtually any moving carriage imaging or plotting system. A moveable pen carriage, generally referenced by numeral 10, is secured to and controlled by a closed flexible carriage band 14. Carriage band 14 may be fabricated from any number of flexible strong materials. However, in its preferred form it comprises a generally flat ribbon-like band of stainless steel. An upper track 11 and lower track 12 are supported parallel to the motion path of the forward portion of carriage band 14 by means not shown. Any of the presently available track support structures used in graphic recorders may be used to support carriage 10 provided a substantially rigid construction which supports the weight of pen carriage 10 is provided.

Pen carriage 10 includes a pen shuttle guide 50 formed of a lightweight, rigid plastic material. A pair of generally U-shaped wheel support members, also formed of a lightweight, rigid plastic material 51 and 52, are secured to pen shuttle guide 50. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end. A quartet of grooved wheels 40, 41, 42, and 43 are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 10 and lower track 12 such that pen carriage 10 is freely moveable in the directions indicated by arrows 23 and 24. Pen carriage 10 further includes a downwardly extending stop block 68 adjacent wheel support 52, the function of which is set forth in greater detail below.

In accordance with the multiple pen capability described above, pen carriage 10 supports a plurality of generally elongated pen shuttles 70 through 77 which are moveably secured to pen shuttle guide 50 in a linear array. Pen shuttles 70 through 77 are generally perpendicular to the direction of travel of pen carriage 10. Pen shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

An elongated beam 46 is pivotally supported by means (not shown) in accordance with conventional graphic recorder fabrication techniques in a position slightly above and substantially parallel to the major axis of media roller 81. A pivotal arm 47 is coupled to beam 46 and extends toward media roller 81. A motor 48 is coupled to arm 47 such that operation of motor 48 causes rotation of beam 46 as indicated by arrow 89. A roller arm 55 has a generally elongated structure defining an aperture 59 at one end and receives beam 46.

Roller arm 55 further defines an inwardly facing axle 87 at the other end and supports an upwardly extending pin 86. Roller 88 is rotationally coupled to axle 87 and in its preferred form comprises a soft elastic material such as plastic or rubber. A second roller arm 90 generally similar to roller arm 55 is supported upon beam 46 on the opposite end of media roller 81 from roller arm 55 and defines an inwardly facing axle 91 which in turn supports a second roller 92 similar in size and fabrication to roller 88.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counterweight 15. Except for the gap at counterweight 15, carriage band 14 comprises a continuous ribbon of material extending from fastener 28 around pulley 20 through pen carriage 10 and around drive pullyy 30 to fastener 29. As a result, carriage band 14 extends through pen carriage 10. Pulley 20 comprises a free moving idler pulley while drive pulley 30 supports a ring gear 32. A carriage motor 16 which may comprise any of the number of presently available bidirectional electric motors, supports a drive gear 33 at one end which, in accordance with generally accepted principles of graphic recorder construction, is operatively coupled to the armature of carriage motor 16 (not shown) such that energizing carriage motor 16 results in rotating gear 33. A pair of electrical connections 35 add 36 are coupled to a pair of wires 38 and 37 respectively. Drive pulley 30 is supported with respect to gear 33 such that gear 33 engages gear 32 causing drive pulley 30 to rotate in response to energizing of carriage motor 16. An encoder 18 is coupled to motor 16 at the opposite end from drive gear 33. While any number of presently available encoder systems may be used for encoder 18, it has been found to be advantageous to use an optical encoder. Such optical encoders are well-known and typically include an encoder disk coupled to the motor shaft having a plurality of optically opposed areas interleaved about its periphery which are sensed by an optical pickup having a light source and detector. As the encoder disk rotates, the areas disrupt the light coupling between the light source and the sensor to produce a series of motion indicative signals. Accordingly, encoder 18 includes an encoder disk 49 having interleaved opaque and transparent areas 88 and 89 respectively which is coupled to the rotor shaft of motor 16 (not shown). A sensor assembly 58 inclues a pair of optical pickups (described below) which are coupled to computer controller 17.

By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. Actuator beam 13 is operatively coupleable to selected ones of pen shuttles 70 through 77 to produce vertical motion of a selected one of pens 60 through 67.

A computer control unit 17 constructed in accordance with the present invention and described below in greater detail, is operatively coupled to terminals 35 and 36 of motor 16 by connections to wires 38 and 37 respectively and to encoder 18 by a pair of wires 43 and 44. A limit stop 45 defines a generally rectangular stop portion 78 which further defines a generally vertical surface 69. A frame 19, the details of which are not shown but which should be understood to be constructed in accordance with conventional graphic recorder techniques, defines a generally flat surface 39. Limit stop 45 is positioned upon surface 39 such that surface 69 is within the travel path of carriage 10. As a result, movement of carriage 10 toward limit stop 45 produces contact between surface 69 of limit stop 45 and wheel support 52 which obstructs further carriage motion. In accordance with an important aspect of the present invention, the position of limit stop 45 along the travel path of carriage 10 is selected such that the point at which surface 69 contacts wheel support 52 coincides with the desired left side reference point or limit of carriage 10 travel. For purposes of illustration, limit stop 45 is shown as a separate member supported by surface 39 of frame 19. However, it will be apparent to those skilled in the art that any obstruction, including structural members of the graphic recorder itself, may be used to provide the function of limit 45.

In operation, motor 48 is operated so as to pivot arm 47 upwardly and produce a corresponding clockwise rotation of beam 46 which in turn rotates roller arms 55 and 90 and raises rollers 88 and 92 away from and out of contact with media 80. With rollers 88 and 92 raised, media 80 is freely moveable upon media roller 81 and is positioned thereupon at the desired alignment and right to left position for the graphic recording process. It should be noted that roller arm 55 is moveable laterally upon beam 46 to adjust the position of roller 88 to accommodate different widths of media 80. For reasons set forth below in greater detail, the preferred positioning of media 80 in the present invention system requires placing the left edge of media 80 beneath roller 92 and adjusting the position of roller arm 55 to accommodate the width of media 80. Accordingly, roller arm 90 is not moveable with respect to beam 46 but rather is precisely positioned at the desired left edge position of media 80. Once media 80 is properly positioned and roller arm 55 is positioned upon beam 46 to accommodate media 80, motor 48 is activated to rotate arm 47 downwardly causing a counterclockwise rotation of beam 47 which in turn pivots roller arms 55 and 90 and brings rollers 92 and 88 into contact with the edges of media 80. In accordance with an important aspect of the present invention it should be noted that because pin 86 is supported by roller arm 55 the position of pin 86 along the travel path of pen carriage 10 is also adjusted by positional adjustments of roller arm 55 to accommodate the width of media 80. Aperture 59 is sized with respect to the cross-section of beam 46 to provide a precision fit therebetween with very little clearance. As a result, roller arm 55 is freely moveable upon beam 46 when roller 88 is out of contact or raised with respect to media 80. Conversely, when motor 48 pulls arm 47 downwardly and causes rollers 88 and 92 to be held against media 80, the force coupled to beam 46 causes arm 55 to be securely positioned upon beam 46. The importance of this aspect of the present invention system will be set forth below in greater detail. However, suffice it to note here that once rollers 88 and 92 are brought into engagement with media 80, roller arm 55 is for all practical purposes immovable with respect to beam 46 and media 80.

Once media 80 is properly positioned and rollers 88 and 92 engage media 80, computer control 17 commences the initialization process to establish the above-described reference or limit point which will be used by computer control 17 in determining the position of pen carriage 10. At the outset, computer control 17 activates carriage drive motor 16 such that drive pulley 30 is rotated in the clockwise direction which in turn drives carriage band 14 in the same direction. With the clockwise motion of carriage band 14, pen carriage 10 is moved in the direction of arrow 24 and approaches limit stop 45. As will be described below in greater detail, the speed of motion of pen carriage 10 during the initialization process is carefully controlled to accomplish the initialization or reference point determination within a reasonable period of time while limiting the speed of pen carriage 10 to avoid damage to the pen carriage. Pen carriage 10 is moved at that predetermined speed until wheel support 52 contacts surface 69 of limit stop 45. At the point of contact, motion of pen carriage 10 is obstructed and motor 16 continues to attempt to drive carriage 10 in the direction of arrow 24. In the brief interval of time that follows, by means set forth below in greater detail, computer control 17 responds to the lack of motion of pen carriage 10 caused by the contact between wheel support 52 and limit stop 45 and sets the left side or limit reference point within computer control 17 to correspond to that position of pen carriage 10.

Once the left side limit reference point has been established, computer control 17 then activates carriage motor 16 to rotate drive pulley 30 in the counterclockwise direction which in turn rotates carriage band 14 in the counterclockwise direction and moves pen carriage 10 in the direction indicated by arrow 23. The motion of pen carriage 10 continues at the controlled speed described above until pen carriage 10 passes over roller arm 55 and until pin 86 thereon contacts stop block 68 on pen carriage 10. Because roller arm 55 is substantially immovable in its engaged position, the contact between pin 86 and stop block 68 once again obstructs the motion of pen carriage 10. Thereafter, a brief interval follows in which motor 16 continues to attempt to drive pen carriage 10 in the direction of arrow 23. The relative positions of pen carriage 10, arm 55, pin 86, and stop block 68 at this point are better seen in FIG. 2. As will be apparent by reference to FIG. 2, the position of stop block 68 upon pen carriage 10 assures that all of the recording pens of pen carriage 10 have passed beyond the extreme right margin of media 80 before pen carriage 10 reaches the limit position. As a result, none of the surface of media 80 is outside of the path of pen carriage 10. By means set forth below in greater detail, computer control 17 senses the obstruction created by pin 86 and stop block 68 and sets the right side limit reference point to correspond to the position of pen carriage 10 at that time.

Once the initialization process is complete and the reference or absolute points are established, further motions of pen carriage 10 are interpreted by computer control 17 solely in response to the output of encoder 18. Specifically, computer control 17, by means set forth below in greater detail, is operative to cause motor 16 to drive carriage band 14 and thereby pen carriage 10 back and forth along the travel path indicated by arrows 23 and 24 to produce motion of pen carriage 10 in either of two directions along the carriage travel path.

During the plotting motions of pen carriage 10, a corresponding motion is imparted to encoder disk 49. Encoder disk 55 comprises a plurality of opaque areas 89 interleaved with a corresponding plurality of transparent areas 88. A sensor 58 constructed in accordance with conventional optical encoder techniques responds to the rotation of encoder disk 49 and produces a plurality of pulse signals indicative of the extent of encoder disk motion and the direction of that motion. The pulse signals produced by sensor 58 are processed by encoder 18 and coupled to computer control 17 by wires 43 and 44. By means described below in greater eetail, computer control 17 utilizes the pulse signals produced by encoder 18 to determine the position of pen carriage 10.

Concurrently, additional control means not shown but which may be constructed in accordance with computer control 17 as set forth below, are operatively coupled to media roller 81 through conventional fabrication techniques to rotate media roller 81 in either of the directions indicated by arrow 84 and cause a corresponding motion of media 80 in either of the directions indicated by arrow 85. By means set forth in greater detail in the above-referenced copending application, a selected pen shuttle, such as pen 74, is moved by rotation of actuator beam 13 in a downward direction until pen point 34 of pen 64 contacts the surface of media 80.

Thereafter, combinations of pen carriage motion in directions indicated by arrows 23 and 24 together with coordinated motions of media 80 in the directions indicated by arrow 85 result in recording a plurality of line markings 83 upon media 80.

Figure 2:
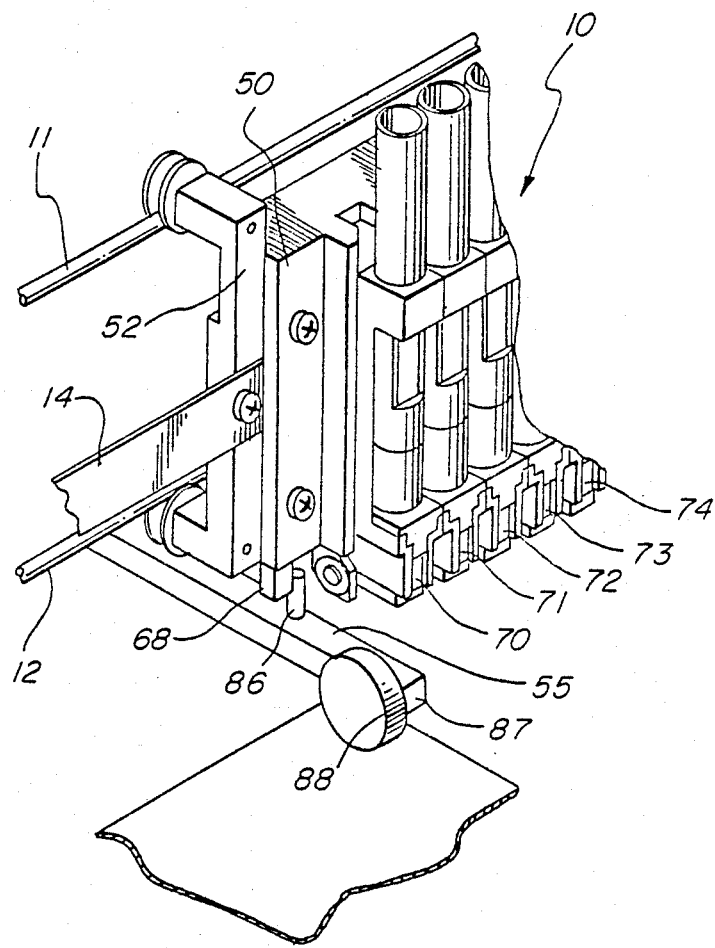
FIG. 2 is a partial perspective view of a graphic recorder and following error limit system constructed in accordance with the present invention.

FIG. 2 sets forth the position of pen carriage 10 with respect to lower arm 55 during the above-described operation establishing the right side reference point. In the position shown, pen carriage 10 which supports wheel support 52 at its left end is carried by carriage band 14 and supported upon upper track 11 and lower track 12 as described above. Stop block 68 extends downwardly from the left edge of pen shuttle guide 50. As mentioned above, roller arm 55, extends beneath the travel path of pen carriage 10 and supports roller 88 upon the right edge of media 80. In accordance with the invention, pin 86 extends upwardly from arm 55 and is positioned with respect to stop block 68 such that a motion of pen carriage 10 to the right is limited by the contact of pin 86 and stop block 68. As a result, the motion of pen carriage to the right is obstructed.

Figure 3:
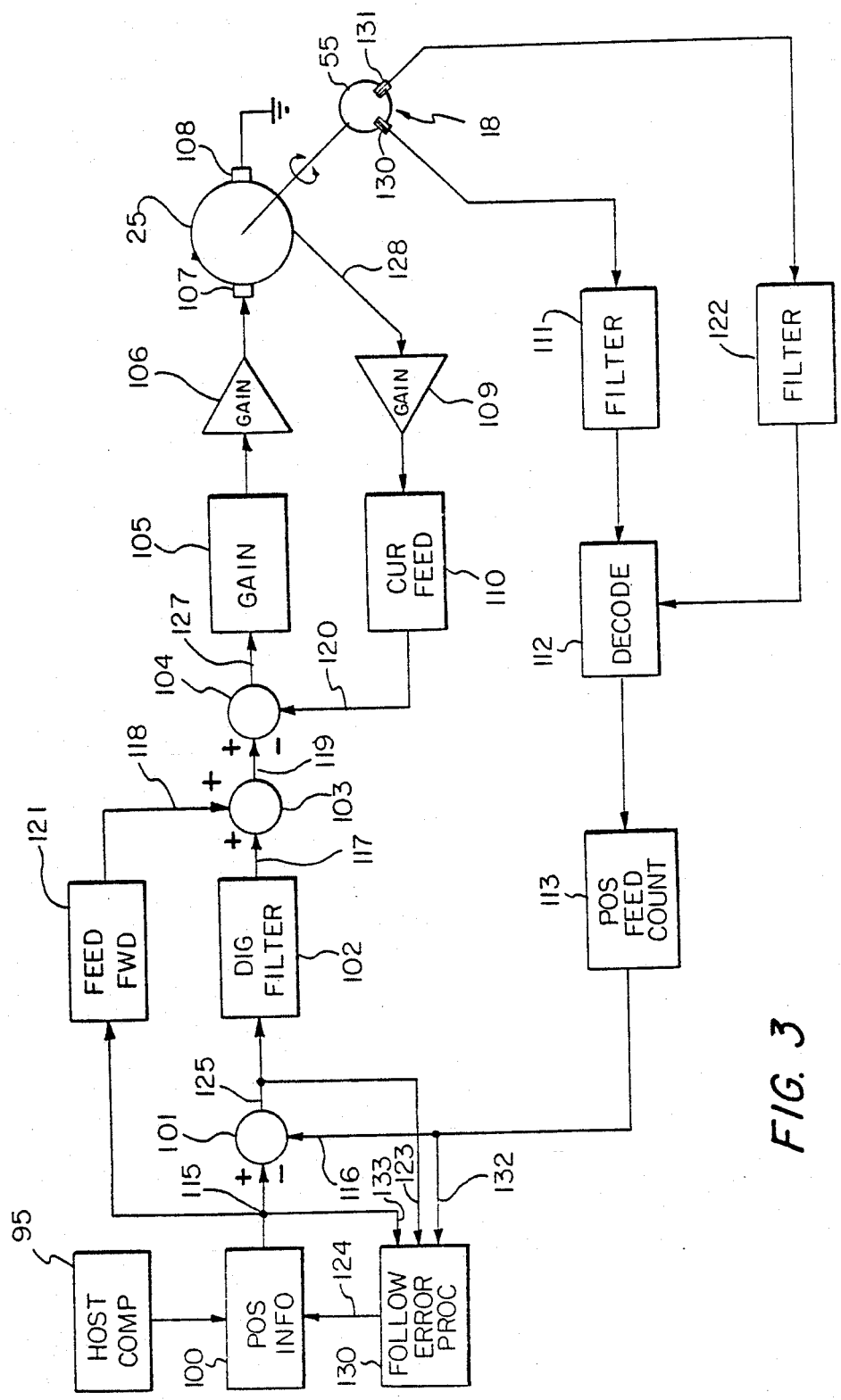
FIG. 3 is a block diagram of a graphic recorder and following error limit system constructed in accordance with the present invention.

FIG. 3 sets forth a block diagram representation of computer controller 17 constructed in accordance with the present invention. A host computer 95 produces a series of digitally encoded information signals which define the set of instructions formulated to cause the graphic recorder to produce the desired image upon the media. A position information processor 100 is coupled to host computer 95 and receives the information signals together with identifying information which permits information processor 100 to select the necessary portions of the output of host computer 95 for processing by computer controller 17 to produce the desired motion of pen carriage 10. While the information produced by host computer 95 varies, in general, the information presented to position information processor 100 includes data defining the selected one of the plurality of recording pens to be used together with vector information for the pen carriage and the media transport system. Pen carriage vector information, in essence, defines a starting point and a destination point for each motion of pen carriage 10. Position information processor 100 selects the vector information from the remainder of host computer output.

A comparator 101 has a negative input 116, a positive input 115 coupled to position information processor 100, and an output 125. A feedforward circuit 121 is coupled to position information processor 100. A digital filter 102 is coupled to output 125 of comparator 101. A comparator 103 has a positive input 117 coupled to digital filter 102, a positive input 118 coupled to feedforward circuit 121 and an output 126. A comparator 104 has a positive input coupled to output 126 of comparator 103, a negative input 120 and an output 127. A gain circuit 105 is coupled to output 127 of comprrator 104 and a current feedback counter 110 is coupled to negative input 120 of comparator 104. Amplifier 106 is coupled to gain circuit 105. A bidirectional DC motor 16 includes an armature terminal 107 coupled to amplifier 106 and an armature terminal 108 coupled to ground. Motor 16 further includes a back EMF output terminal 128. A feedback amplifier 109 is coupled to terminal 128 of motor 16 and to current feedback counter 110. An encoder 18 includes an encoder disk 49 and a sensor assembly 58 which supports a pair of optical sensors 130 and 131.

A position feedback counter 113 is coupled to negative input 116 of comparator 101. A decoder 112 is coupled to position feedback counter 113. A pair of noise filters 111 and 122 are coupled to decoder 112 and to sensors 130 and 131 of encoder 18 respectively.

A following error processor 130 has an input 123 coupled to output 125 of comparator 101 and an output 124 coupled to position information processor 100.

In operation, host computer 95 initiates a set of instructions for position information processor 100 which define the desired motion of pen carriage 10. As mentioned above, the information provided by host computer 95 to position information processor 100 includes a vector definition of the desired pen carriage motion together with speed and acceleration information. Position information processor 100 converts the applied vector speed and acceleration information into a series of commanded positions which are coupled to comparator 101. As described below, comparator 101 also receives the signals representing the actual position of motor 16 at input 116. In response, comparator 101 produces an output signal indicative of the difference between the commanded position and the actual position of motor pen carriage 10. This difference signal is referred to as the following error.

In addition, the commanded position signals from position information processor 100 are applied to feedforward circuit 121. In accordance with generally accepted fabrication of servo motor systems, feedforward circuit 121 couples a portion of the commanded position signal directly to one input of comparator 103. The remainder of output signal of comparator 101 is processed by digital filter 102 which provides compensation for irregularities in the processing system and avoids the system tendency to hunt and oscillate. In essence, digital filter 102 smoothes out or filters the control signal and determines the response time of the servo system. The filtered following error signal output of digital filter 102 is applied to input 117 of comparator 103. As should be noted, inputs 117 and 118 from digital filter 102 and feedforward circuit 121 respectively, are in phase inputs or positive phase inputs. As a result, the output of comparator 103 in essence is an additive combination of the filtered output of digital filter 102 and feedforward circuit 121 which is applied to input 119 of comparator 104. The output signal of comparator 104 is amplified by successive gain stages 105 and 106 and applied to armature terminal 107 of motor 16. In accordance with conventional DC motor construction, motor 16 responds to the applied signal from amplifier 106 to produce armature motion.

A conventional feedback sensor 128 within motor 16 senses the back EMF produced by motor 16 during its rotation in the form of a proportional voltage which is coupled to feedback amplifier 109. It should be noted that in accordance with conventional servo motor techniques, sensor 128 produces a voltage proportional to the back EMF of motor 16 which in turn is proportional to the rotational speed of the motor. As a result, the output of feedback amplifier 109 comprises a voltage proportional to the speed of motor 16 which is applied to current feedback counter 110. An analog to digital conversion of the back EMF indicative signal is performed by feedback counter 110 producing a digital signal indicative of the speed of motor 16. The output of current feedback counter 110 is coupled to negative input 120 of comparator 104 completing the feedback path for the motor. The feedback system formed by sensor 128, feedback amplifier 109, current feedback counter 110 and comparator 104 is operative at a substantially higher cycle frequency than the remainder of the servo system to provide a limited effect, high speed control loop operative upon motor 16. The use of this high speed loop compensates for minor variations encountered by the carriage drive system such as friction within the system, minor inaccuracies of system mechanical parts, or system wear. It should be noted that the high speed feedback loop is operative solely in response to speed of motor 16 and is not coupled to or fed from encoder 18.

In addition to producing the back EMF used in the above-described feedback, rotation of motor 16's armature also rotates encoder disk 49 which in accordance with the above-described operation of optical encoder 18, produces output signals at sensors 130 and 131. In accordance with conventional servo control loop construction, sensors 130 and 131 are placed with respect to each other and encoder disk 49 such that their output signals are in quadrature phase. As a result, the optical encoder signals applied to noise filters 111 and 122 are in quadrature. Noise filters 111 and 122 perform substantially the same functions of filtering or removing noise from the encoder output signals. The filtered quadrature signals are passed by noise filters 111 and 122 to the inputs of a quadrature decoder 112 which, in accordance with conventional quadrature detector operation, produces an output signal indicative of both the motion of encoder disk 49 and its direction. The output of decoder 112 is applied to position feedback counter 113 which functions to accumulate and periodically update an encoder signal count which is in direct correspondence to the movement of encoder disk 49 and thereby the position of pen carriage 10.

As a result, the output signal of position feedback counter 113 represents the actual position of pen carriage 10 which is applied to negative input 116 of comparator 101. As described above, comparator 101 produces an output signal at terminal 125 indicative of the difference between the signal applied to input terminals 115 and 116 which forms the following error of the system. As is known, closed loop servo systems of the type shown in FIG. 3, function in a manner whereby the system is constantly and dynamically moving toward a commanded position. However, because the gain of the feedback system loop is finite, there exists a difference between the commanded position and the actual position at any given time until the system is brought to rest. This difference or lag of the loop servo system is always present, except for periods when pen carriage 10 is at rest at a commanded position. In essence, the system is controlled by providing a series of commanded positions which the servo system moves toward but which it constantly lags behind.

Turning now to following error processor 130, it should be noted that the following error signal is applied to following error processor 130 which in turn, by means set forth below in greater detail, analyzes the following error signal and produces one or more control signals at output 124 which are applied to position information processor 100.

During the initializtion process described above in which pen carriage 10 is first moved to the left until carriage support 52 abuts limit stop 45, position information processor 100 produces a set of output instructions to digital filter 102 and feedforward circuit 121 which establish carriage motion at a predetermined constant velocity. In accordance with the basic operation of the servo system shown in FIG. 3, the output signals from position information 100 are coupled by digital filter 102 and feedforward circuit 121 to comparator 103 in which they are added and coupled by comparator 104 through consecutive gain circuits 105 and 106 to energize motor 16. Once motor 16 begins turning, a back EMF signal is produced which is sensed by sensor 128 and fed back through feedback amplifier 109 and current feedback counter 110 to provide a negative feedback signal for comparator 104. As mentioned above, the loop formed by feedback amplifier 109, current feedback counter 110 and gain stages 105 and 106 and comparator 104 is a high speed system utilized to accommodate minor variations in the load upon motor 16. In addition, rotation of motor 16 rotates encoder disk 49 producing a pair of quadrature phased output signals which are coupled by noise filters 111 and 122 to decoder 112.

Decoder 112 then produces an output signal indicative of the direction and relative motion of encoder 18 which are then used to update position feedback counter 113 as it maintains an ongoing count of carriage position. The output signal of feedback counter 113 is applied to comparator 101 and to following error processor 130. The actual position feedback signal is compared to the commanded position by comparator 101 and an output signal comprising the following error of the system is produced at output 125.

During normal operation, that is, in the absence of pen carriage 10 obstruction, the foregoing process continues on an ongoing basis in which position information processor 100 continues to output commanded positions just ahead of the actual position causing the servo loop to respond with continued motion of motor 16.

In addition to the foregoing servo loop operation, following error processor 130 receives input signals at input 132 indicative of the actual position of pen carriage 10, the following error signal at input 123, and the commanded position signals produced by position information circuit 100 at input 133. As pen carriage 10 continues to move to the left at the established constant velocity under the control of position information circuit 100 and the foregoing described servo loop operation, following error processor 130 provides periodic sampling of the above input signals and compiles a table of information as shown in FIG. 4.

FIG. 4 sets forth a representation of the information compiled within following error processor 130 during the initialization process. The sampled absolute position, commanded position and following error are shown in FIG. 4 corresponding under their corresponding labeled headings. Times 0 through 6 are representative of the sequence produced which may for example, correspond to the initiation of motion of pen carriage 10 from a starting position of pen carriage 10 represented by a position of 10. In such case, the commanded position produced by position information processor 100 to develop a constant velocity motion of pen carriage 10 will be 11. In accordance with the above-described servo system operation, a difference between the commanded position and the absolute position describes the following error of the system. In this instance, the difference is 1 which appears in the column under the heading marked following error. At time 1, a second cycle of the above sampling takes place in which time is now 1 and the absolute position has changed from 10 to 11. During that same time, in accordance with constant velocity operation, the commanded position changed to 12 which again results in a following error of 1. This process continues through times 2, 3, 4, 5 and 6 and so on in which the absolute position and commanded position differ by 1 resulting in following errors of 1. So long as pen carriage 10 is in motion, this process continues and following error remains 1. After some period of time, indicated by the break in the table of FIG. 4, a later time such as the time 1,000 or the 1,000th cycling of the sampling system is reached in which case the absolute position has become 1,010 and the commanded position has become 1,011. In similarity to the foregoing computation, the difference between commanded position and absolute position, that is, the following error remains 1. This process again continues to repeat through times 1,001, 1002 and 1003.

In addition to the foregoing accumulation of time, absolute position, commanded position and following error, following error processor 130 performs an additional calculation in accordance with an important aspect of the present invention. During each sampling period, following error processor 130 further computes a following error delta entry which comprises the difference in following error between the present sample time and the following error which preceded the sample time by a predetermined number of cycles (base sample). The selection of time interval between the present following error and the base following error used in computing following error delta is to a large extent empirical and is a matter of optimization of design for a given system. The factors which contribute to this determination are those which describe the degree of flexibility or give in the driven system. It has been determined that the foregoing described pen carriage structure which is extremely tight and inflexible, is optimized by using an interval of 19 cycles between the present sampling of following error and the base following error. As a result, at each sampling time, following error processor 130 calculates the difference between the following error in that present sampling time and the following error which occurred during the base sample time (19 cycles earlier). In other words, at sample time 1,000 in which the following error is 1, the following error delta results from a subtraction of the following error existing at time 1,000 form the following error sampling 19 cycles earlier or time 981. As mentioned above, the motion of pen carriage in the absence of an obstruction, is a constant velocity motion in which the difference between commanded position and absolute position, that is, the following error, remains 1. As a result, while not shown on FIG. 4 due to the break in the table, it will be apparent to those skilled in the art that if the operation set forth in times 0 through 6 continued through to time 1,000, the following error would also be 1 at time 981. In such case, the following error delta at time 1,000 is 1−1 or 0.

The above-described operation continues and the information is compiled within the memory in the form shown in FIG. 4. As a result, at time 1,001 through 1,003, the commanded position and actual position continue to be separated by 1 and the following error continues to be 1. Similarly, the difference between the following error at times 1,001 through 1,003 ontinues to be the same as that which occurred 19 cycles earlier and the following error delta continues to be 0.

At time 1,004 however, some event occurs in the motion of pen carriage 10 in which the absolute position remains 1,013 notwithstanding the incrementing of the commanded position from 1,014 to 1,015. As a result, the following error increases at time 1,004 from 1 to 2. Since the base following error 19 cycles earlier is 1 the difference or delta of following error has increased from 0 to 1. At time 1,005, a position of pen carriage 10 remains the same at 1,013 notwithstanding the incrementing of commanded position to 1,016. As a result, the following error again increases from 2 to 3 and the following error delta increases from 1 to 2. In times 1,006 through 1,020 the absolute or actual position of pen carriage 10 remains fixed at 1,013 while the commanded position continues to increase in accordance with the normal constant velocity operation of position processor 100. As a result, each succeeding time produces a commanded position increasing by 1 with a constant absolute position, and as can be seen in FIG. 4, at times 1,006 through 1,020 following error increments 1 number each cycle from 4 through 18. Correspondingly, the following error delta increases by 1 during each sampling from the following error delta of 3 at time 1,006 to a following error delta of 17 at time 1,020.

In accordance with an important aspect of the present invention, a maximum following error delta is established within following error processor 130. Once the maximum following error delta is reached, the system initiates a limit stop determination. The maximum following error delta is also empirically derived. For the mechanical construction drive of pen carriage 10 in the present invention embodiment, a maximum following error delta of 18 has been established to trigger limit determination. As can be seen, the increasing following error delta reaches 18 at time 1,021. In response, following error processor 130 establishes the limit stop or reference point of the initialization process for the left side to correspond to the actual position of pen carriage 10 at the base time at which the following error delta reached 18. That is to say, a reference limit point for the left side is established at position 1,012. Following error processor 130 then communicates the information indicating that the left side absolute or limit position corresponds to the position of pen carriage 10 at time interval 1,002. This provides the above-described margin reference point for pen carriage control.

A similar operation then takes place in the determination of the right hand limit in which pen carriage 10 is moved at a constant velocity to the right and the foregoing described calculations are periodically made in following error processor 130. At some point, pen carriage 10 reaches a position in which stop block 68 encounters pin 86 (seen in FIG. 2) and the above-described following error delta occurs. Once the following error delta reaches 18, the following error processor determines that the position occupied by the pen carriage 19 cycles earlier corresponds to the right side limit position. This information is supplied by following error processor 130 to position information processor 100.

With the initialization function complete, the operation of pen carriage 10 continues under the control of position information processor 100 and the recording operation is carried out.

What has been shown is a low cost easy to manufacture and reliable system for providing the limit switch function in moveable carriage type recording systems which also provides the accuracy required for quality recording.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a graphic recorder having motor drive means for moving a pen carriage back and forth along a carriage path characterized by a system degree of flexibility and servo control means characterized by a following error signal and operative upon the motor drive means to control pen carriage motion, limit means for establishing a carriage travel reference point comprising:

means obstructing carriage motion at a predetermined point;

sensing means coupled to said servo control means detecting the response of the following error of said sevvo control means to the carriage obstruction and establishing a predetermined maximum following error related to said system degree of flexibility;

reference means coupled to said sensing means establishing a carriage travel reference point when said following error exceeds said predetermined maximum following error.

2. Limit means as set forth in claim 1 wherein said motor drive means include means moving said carriage in a selected direction at a predetermined initialization speed and wherein said reference means are responsive solely to obstructions occuring during carriage travel at said initialization speed.

3. For use in an image recorder in which an imaging carriage is moved along a carriage path under the control of a closed loop servo control system producing a following error signal indicative of the difference between the commanded position of the carriage and the actual position and in which a servo controller produces a series of commanded positions and means are provided to determine relative motion of the carriage, following error limit means for establishing a carriage reference position of the carriage comprising:

drive means for moving the carriage in a first direction;

first stop means for mechanically obstructing the motion of the carriage in said first direction at a first predetermined position; and sensing means having threshold means for comparing the following error to a predetermined following error reference and determining the occurrence of carriage obstruction when the following error equals the following error reference and establishing a first reference position for motion of said carriage in said frist direction having a predetermined relationship to the position of the obstruction by said first stop means.

4. Following error limit means as set forth in claim 3 wherein said image recorder is characterized by a system degree of flexibility and wherein said predetermined following error reference is determined as a function of said system degree of flexibility.

5. Following error limit means as set forth in claim 4 wherein said sensing means include sample means periodically determining the commanded position, actual position and following error and accumulating each in a look-up table.

6. Following error limit means as set forth in claim 5 wherein said sensing means further include:

base means responsive to said threshold means and operative upon the occurrence of a following error in excess of the predetermined following error reference to establish said carriage reference position corresponding to the actual carriage position existing a predetermined number of sample periods prior to the occurrence of a following error exceeding the following error reference.

7. Following error limit means as set forth in claim 6 wherein said series of commanded positions is selected to produce a constant carriage velocity in the absence of a carriage obstruction and wherein said following error is constant in the absence of a carriage obstruction.

8. Following error limit means as set forth in claim 3 wherein said drive means include means for moving the carriage in a second direction opposite to said first direction and wherein said following error limit means further include:

second stop means for mechanically obstructing the motion of the carriage in said second direction at a second predetermined position.

9. Following error limit means as set forth in claim 8 wherein said sensing means detect the obstruction of carriage motion in said second direction and establish a second reference position for motion of said carriage in said second direction having a predetermined relationship to the position of the detected obstruction of said second stop means.

* * * * *